June 11, 1957  J. D. ROBERTSON ET AL  2,795,029
SKEW DETECTING METHOD AND APPARATUS
Filed June 25, 1954  6 Sheets-Sheet 5
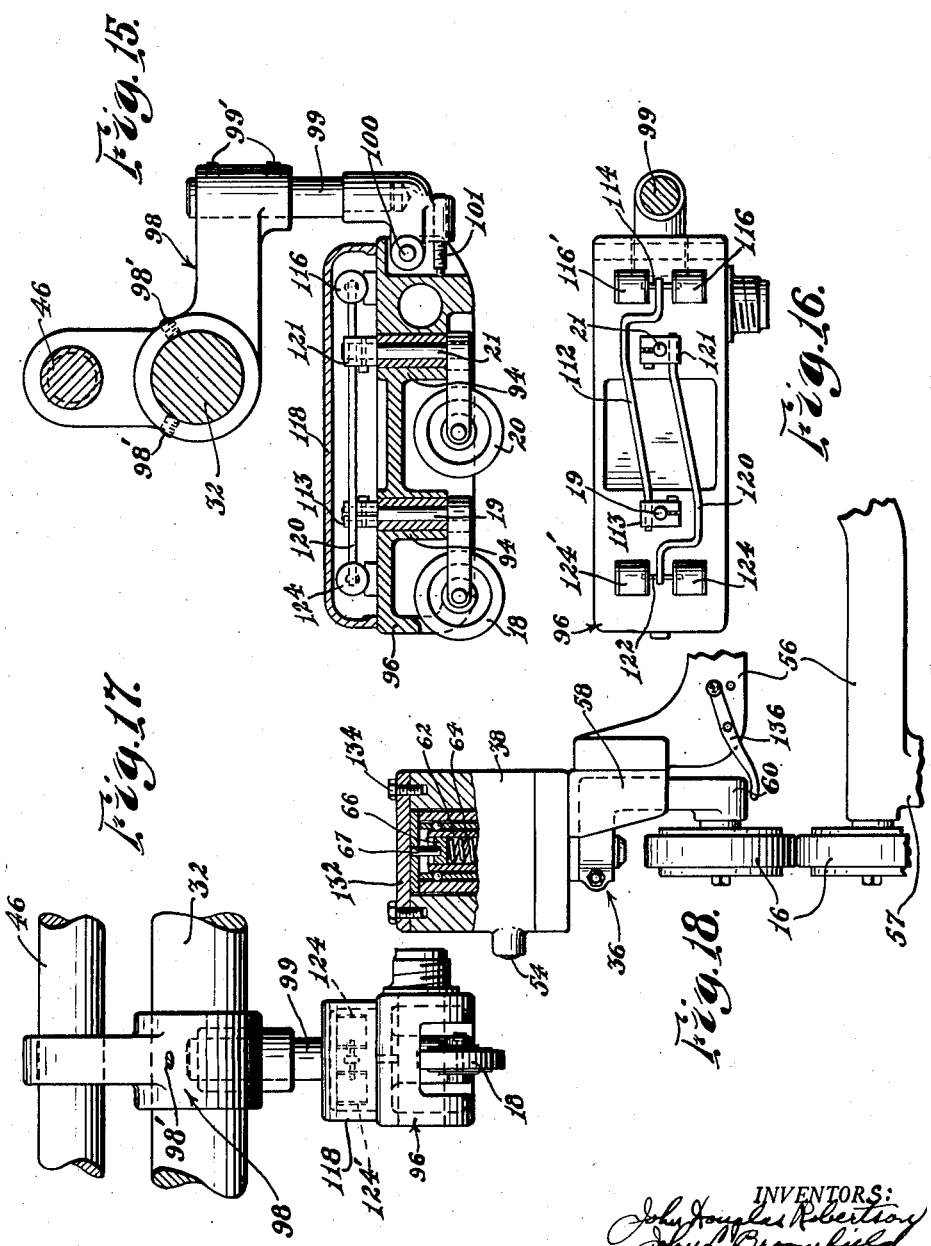
INVENTORS:
John Douglas Robertson
John L. Broomfield
BY
John H. McKenna
Their Atty.

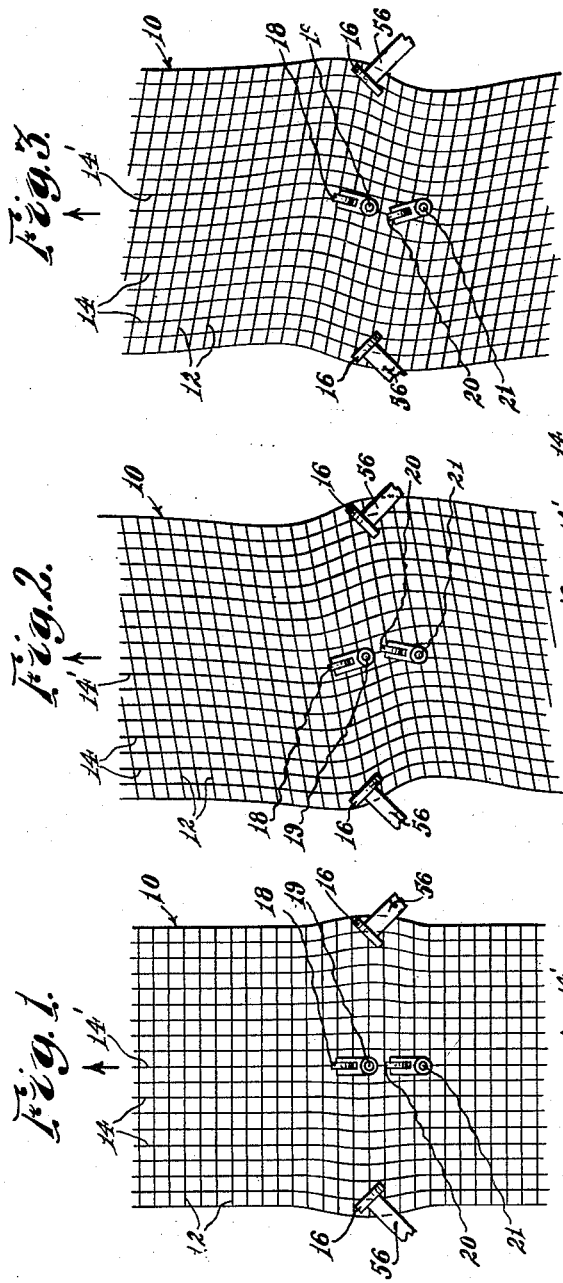

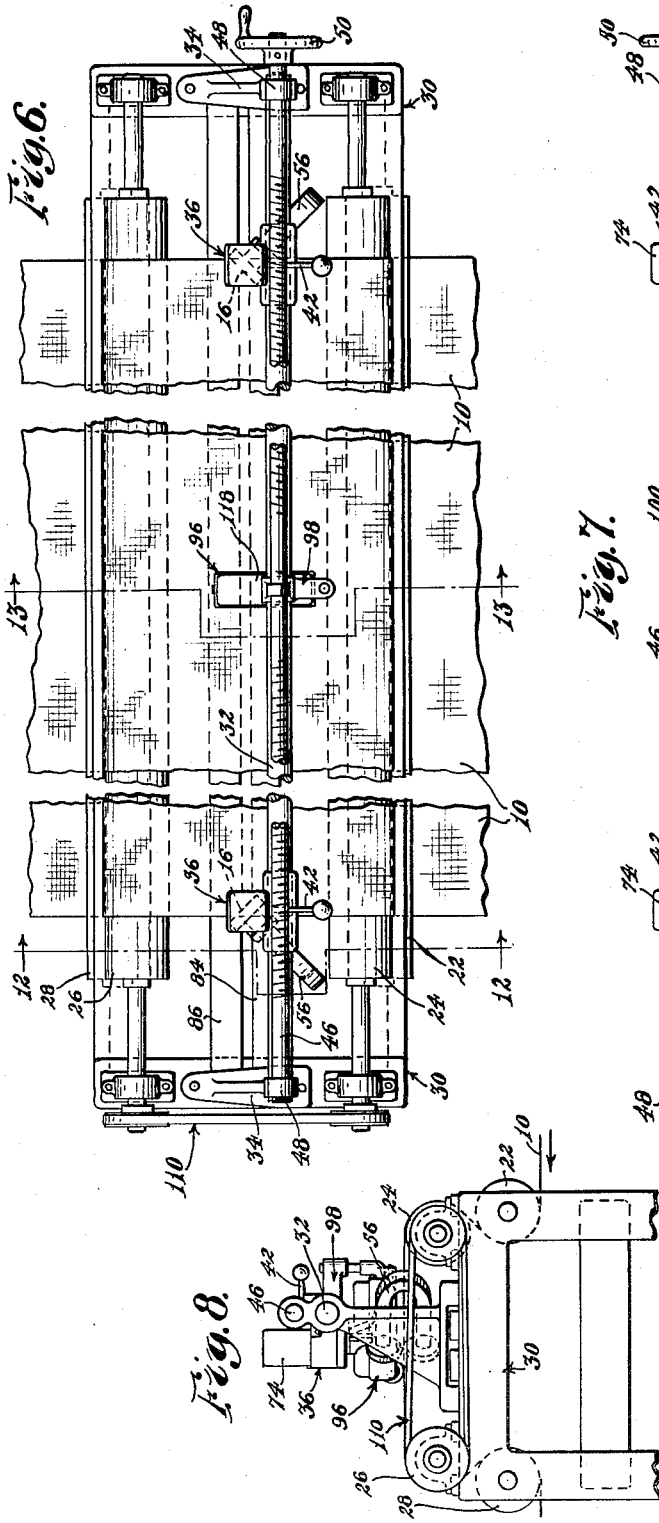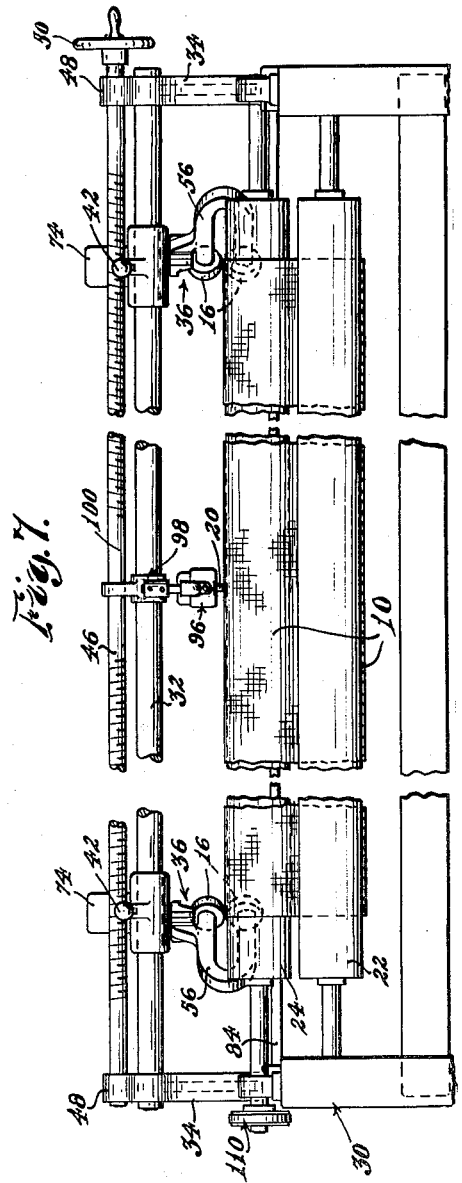

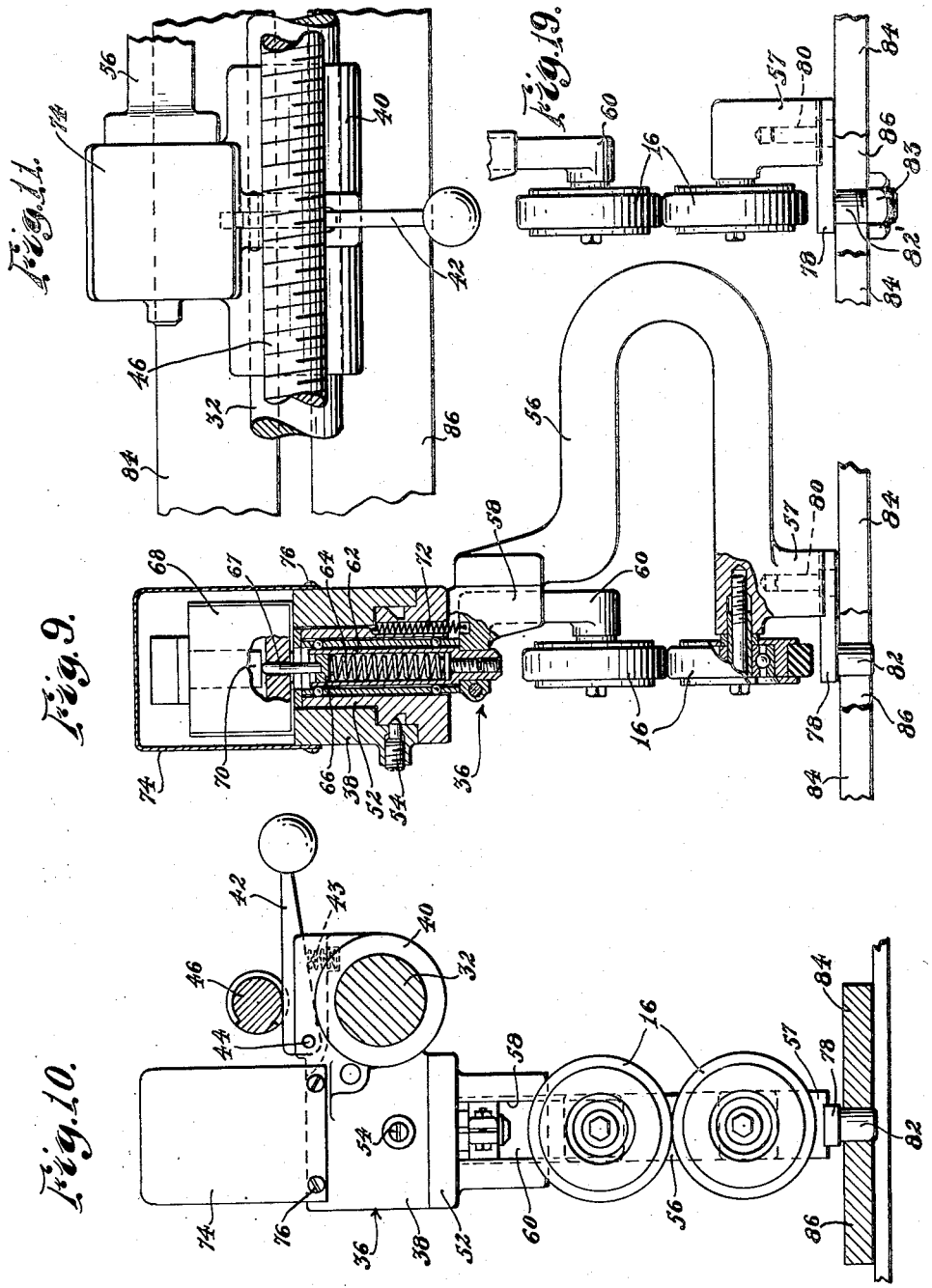

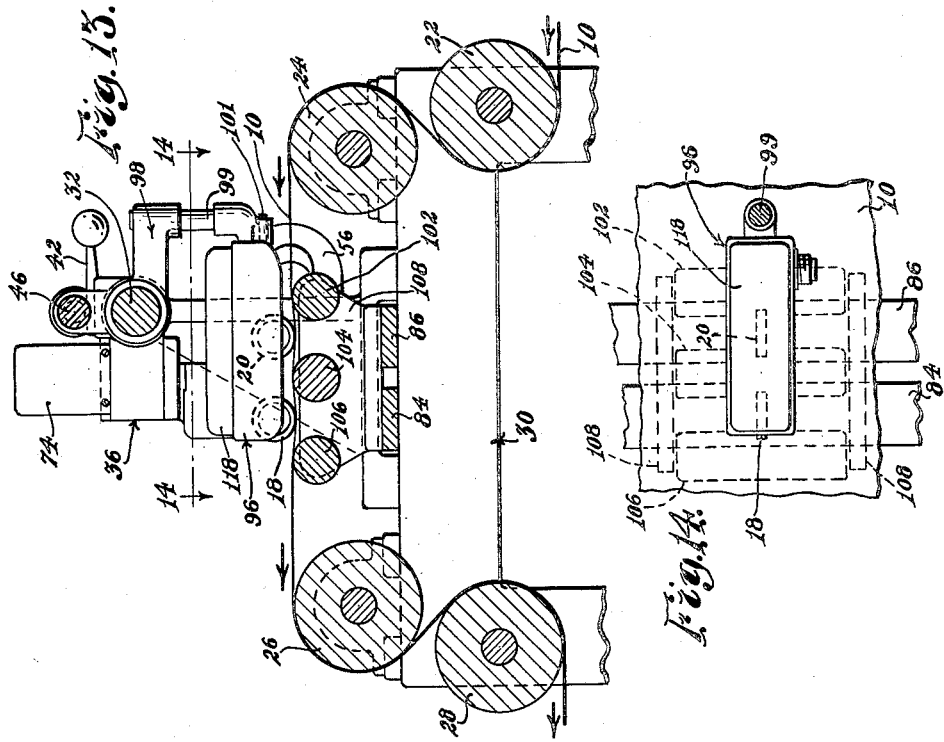

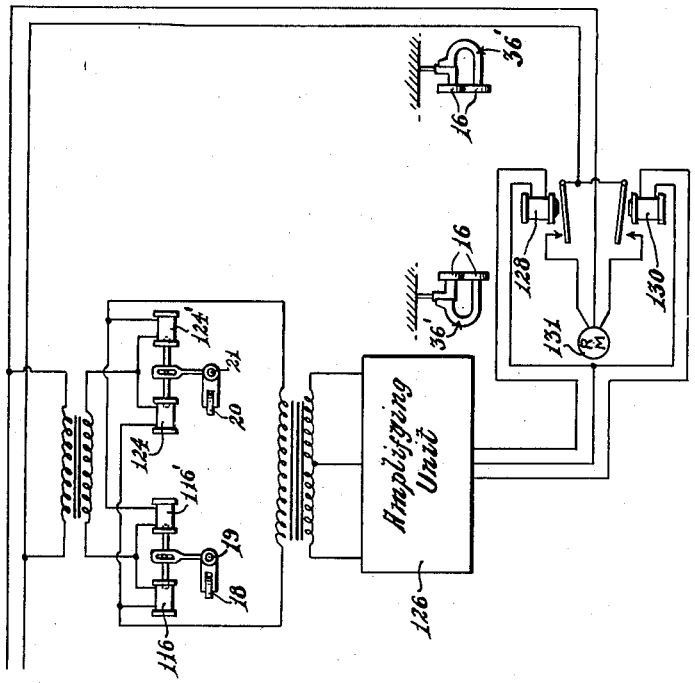
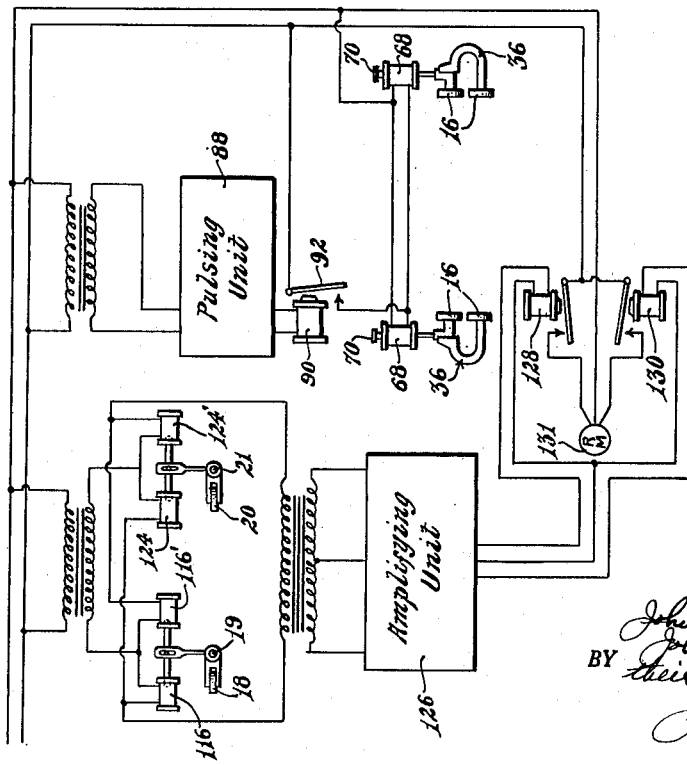

2,795,029
SKEW DETECTING METHOD AND APPARATUS

John Douglas Robertson, Taunton, and John L. Broomfield, Harvard, Mass.; said Broomfield assignor to said Robertson Application June 25, 1954, Serial No. 439,372

19 Claims. (Cl. 26—51.4)

This invention relates to improvements in methods and apparatus for detecting any abnormal condition of the weft elements relative to the warp elements of a travelling woven web or sheet, the term "weft elements" and the term "warp elements" being used in a broad sense to include respectively the transverse and the longitudinal elements of woven webs or sheets regardless of the material of which the transverse elements are made. For example, the invention has particular utility for detecting abnormalities of the weft or filler threads in woven fabric webs and sheets, but may be employed for detecting abnormalities of the transverse elements of webs and sheets woven of any of various synthetic or glass fibres, or of wire, or combinations thereof.

In the processing of woven webs and sheets, the transverse elements of the woven material frequently become displaced or distorted from their initial and desired perpendicularity to the longitudinal elements of the woven material. In the textile industry, for example, woven fabrics are subjected to various treatments after being woven and the weft threads tend to become skewed and/or bowed, or otherwise distorted, as a woven sheet travels to and through processing stations and equipment. They may assume a skewed arrangement in which their ends at one selvage may lead or lag behind their ends at the other selvage, or they may become bowed with their central portions either leading or lagging behind their end portions. Frequently they acquire a combination of skew and bow. Sometimes, they assume more or less sinuous shapes in which different portions of the same weft elements may be bowed in opposite directions. It is important that any such abnormalities of the weave be detected and corrected, and various devices have been proposed heretofore for detecting and correcting skew and/or bow. However, none of these prior devices, so far as we are aware, has provided sensitivity and accuracy of detection and of corrective response to the degrees necessary to satisfactorily solve the problems produced by skewing and/or bowing of the weft threads in a woven fabric sheet, or a comparable woven sheet, which is undergoing processing. None of the prior devices, so far as we are aware, is capable of detecting a sinuous condition of the weft elements. Furthermore, the prior devices and procedures for automatic detection of skew and/or bow have been unsatisfactorily slow and unreliable in that they react only when a skew and/or bow has become substantial, and they frequently give spurious signals. Also, the ultimate response of correcting mechanism heretofore has been unduly delayed and, due to lack of accuracy and adequate sensitivity of the prior detecting mechanisms, frequently has resulted in over-correction which itself then may require correction.

It is among the objects of our present invention to provide a detecting method whereby any abnormal condition of the weft elements of a travelling woven sheet may be more effectively and accurately detected as compared with prior detecting procedures. According to the invention, automatic detection of abnormalities of the weft elements is in response to mechanically induced distortions of the warp elements of the woven sheet, the said induced distortions of the warp elements varying in character with variations in the character of any existing abnormalities of the weft elements.

Another object of the invention is to provide detecting apparatus which, as compared with prior comparable mechanisms and devices, is more sensitively responsive in detecting abnormal conditions of the weft elements of a travelling woven web or sheet. The apparatus of the invention effectively detects even relatively small departures of the weft elements, or portions thereof, from proper perpendicularity to the warp elements, and the response of the detecting means to any detected abnormality of the weft elements may be utilized to indicate the character of the abnormality or initiate corrective operation of any suitable weft straightening mechanism.

A further object of the invention is to provide a detecting method and apparatus which, in one embodiment, utilizes induced intermittent distortions of the warp elements of a travelling woven sheet for differentially actuating detector means whose responses vary with differences in the character of the said induced distortions of the warp elements, which differences result from differences in the character of any existing abnormality of the weft elements of the sheet.

Yet another object of the invention is to utilize the characteristics of abnormal weft elements of a travelling woven sheet to determine the character of distortions of warp elements induced at any particular location or locations in response to transverse stretching of the sheet, and to control the operation of weft straightening apparatus in response to variations in the character of the said distortions of the warp elements at the said particular location or locations.

Still another object of the invention is to provide a detecting method and apparatus whereby any abnormal condition of the weft elements relative to the warp elements of a travelling woven sheet may be accurately detected by differentially responsive detecting means which may be located at one location or at a plurality of locations between the opposite edges of the sheet, the said detecting means, or each such means, being actuated by induced distortions of the warp elements, and the character of said induced distortions of the warp elements varying with differences in the character of any existing abnormality of the weft elements thereby to control the nature of the differential response of the detecting means, or of each detecting means.

Another object of the invention is to provide detecting apparatus wherein a detecting means, or each of a plurality of detecting means, engages a travelling woven sheet and is actuated in response to induced distortions of warp elements of the sheet at the region thereof engaged by the detecting means, the said detecting means, or each detecting means, being of a nature to provide no detecting response if and when actuated by the said induced distortions of the warp elements while the weft elements are perpendicular to the warp elements, and to respond differentially when actuated by the said induced distortions whose character is modified by an existing abnormal condition of the weft elements, thereby to indicate the nature and magnitude of the detected abnormality.

It is, moreover, our purpose and object generally to improve detecting procedures and devices and more especially to increase the scope and sensitivity and overall efficiency of such procedures and devices as employed for detecting, indicating and initiating correction of any abnormal condition of the weft elements relative to the warp elements in woven webs and sheets.

In the accompanying drawings:

Fig. 1 is a diagrammatic representation of a section of travelling woven sheet material having its weft elements in proper right angular relation to its warp elements and having means at the opposite edge portions of the sheet for stretching the sheet transversely, and having detector means located centrally between the opposite edges of the sheet, the sheet being shown in stretched condition;

Fig. 2 is a view generally similar to Fig. 1 but showing diagrammatically the effect produced by the stretching when the weft elements are skewed with their ends which are at the right hand edge of the sheet leading their ends which are at the left hand edge of the sheet;

Fig. 3 is a view generally similar to Fig. 2 but showing diagrammatically the effect produced by the stretching when the weft elements are skewed with their ends which are at the left hand edge of the sheet leading their ends which are at the right hand edge of the sheet;

Fig. 4 is a view generally similar to Fig. 1 but having detector means at three different locations between the edges of the sheet;

Fig. 5 represents a section of the width of a wider travelling woven sheet having means acting thereon for separately stretching two different portions of the width of the sheet material, with detector means located centrally of each of the said different portions;

Fig. 5a is a view generally similar to Fig. 2 but having one of the illustrated pair of detector devices spaced a greater distance behind the other than in the earlier views;

Fig. 6 is a top plan view of an apparatus suitable for practising the detecting method of the invention, portions being broken away to conserve space;

Fig. 7 is a front elevation of the apparatus of Fig. 6;

Fig. 8 is an end elevation of the apparatus of Figs. 6 and 7 looking at that end which is to the left in Fig. 7;

Fig. 9 is an elevational view of one variety of sheet-stretching nip-roll unit designed for intermittent stretching of a travelling woven sheet, portions of the unit being in cross-section;

Fig. 10 is an elevational view of the unit of Fig. 9 looking at that side thereof which is to the left in Fig. 9, the supporting elements being in cross-section;

Fig. 11 is a top plan view of the unit of Figs. 9 and 10;

Fig. 12 is a cross-sectional view on line 12—12 of Fig. 6, on a larger scale;

Fig. 13 is a cross-sectional view approximately on line 13—13 of Fig. 6, on the scale of Fig. 12;

Fig. 14 is a fragmentary top plan view, on line 14—14 of Fig. 13;

Fig. 15 shows the supported detector unit of Fig. 13 with the supports and portions of the detector unit in cross-section;

Fig. 16 is a top plan view of the detector unit of Fig. 15 with its cover removed and with a portion of the bracket in cross-section;

Fig. 17 is an end elevation of the supported detector unit of Fig. 15 looking at that end which is to the left in Fig. 15;

Fig. 18 is a view generally similar to Fig. 9 but showing a nip-roll unit whose rollers may constantly engage a sheet for continuous lateral stretching of the sheet;

Fig. 19 is an elevation of a modified form of nip-roll unit which may be mounted for operation on portions of a sheet substantially inward from the edges of the sheet;

Fig. 20 is a wiring diagram of an electrical circuit and connections suitable for effecting a signalling response of a tandem pair of detector rollers, and for effecting the control of intermittently acting nip-rolls; and Fig. 21 is a view generally similar to Fig. 20 but omitting the pulsing unit of Fig. 20, and showing constantly engaged nip-roll units.

Referring to the drawings, the detecting method of the invention is illustrated diagrammatically in Figs. 1–5a wherein a woven web or sheet 10 is represented as travelling in the direction of the arrows. The weft elements 12 and warp elements 14, 14' of the sheet are shown variously distorted as a result of the action of nip-rolls 16 which may act at the opposite edges of the sheet to stretch the entire width of the sheet, as in Figs. 1–4, or which may be arranged to independently stretch predetermined portions of the sheet, as in Fig. 5.

A tandem pair of castor-type rollers 18, 20, or a plurality of tandem pairs of castor-type rollers 18, 20, ride on sheet 10 with the rollers of the tandem pair, or of each tandem pair, adapted to be actuated independently by distortion of the portions of warp elements 14, 14' with which the rollers respectively are engaged.

In Fig. 1, the weft elements 12 are shown in proper perpendicularity to the warp elements 14, 14'. However, the sheet 10 in Fig. 1 is stretched laterally as a result of being engaged between the obliquely disposed nip-rolls 16, of which one pair engages the sheet 10 adjacent to one edge or selvage and another pair engages the sheet 10 adjacent to the opposite edge or selvage, only the upper nip-rolls 16 being visible in Fig. 1. Assuming that the sheet 10 is travelling in the direction indicated by the arrow in Fig. 1, it will be obvious that the oppositely disposed pairs of nip-rolls 16, positioned as in Fig. 1, will have equal stretching effect in generally opposite directions as the sheet is drawn between the nip-rolls in the direction of the arrow. When the weft elements 12 are straight and perpendicular to the warp elements 14, as in Fig. 1, the nip-rolls 16 cause equal and opposite distortion of warp elements 14 at opposite sides of central warp elements 14' which latter remain substantially straight and unaffected by the equalized stretching effect of the nip-rolls 16.

When the weft elements 12 of sheet 10 become skewed, as in Fig. 2, with their ends which are to the right leading their opposite ends, the pull of the nip-rolls 16 acts to rotate the affected portion of the sheet counterclockwise in Fig. 2 and portions of the central warp elements 14' assume oblique relationships to the direction of travel of the sheet, as illustrated in Fig. 2.

If a skew develops in the opposite direction, as represented in Fig. 3, the nip-rolls 16 rotate the affected portion of the sheet clockwise in Fig. 3 and portions of the central warp elements 14' assume an oblique relationship to the direction of travel of the sheet, and this obliquity is opposite to the obliquity of the portions of central warp elements 14' in Fig. 2.

According to the invention, this principle of nip-roll induced stretching of a travelling woven sheet, or of a portion or portions of the width of such a sheet, is utilized to actuate the detector rollers 18, 20 and, when the weft elements 12 are skewed or bowed, or otherwise abnormally related to the warp elements, the rollers 18, 20 become differentially actuated to indicate the character of any abnormality of the weft elements, or of roller-engaged portions thereof.

The castor-type rollers 18, 20 may be mounted in any suitable type of detector unit casing with the roller 18 in advance of the roller 20. If only a single detector unit with its tandem pair of rollers 18, 20 is employed, as in Figs. 1–3, the rollers preferably will engage the central warp elements 14', as in Figs. 1–3, where only skew of the weft elements 12 will be detected. Ordinarily, however, a plurality of detector units will be suitably distributed across the width of the travelling sheet 10 with the plurality of tandem pairs of rolls 18, 20 engaging different warp elements 14, 14', as in Fig. 4, for detecting skew and/or bow, and any other existing abnormality of the weft elements relative to the warp elements.

Referring to Fig. 1, the rollers 18, 20 are not appreciably affected by the lateral stretching of sheet 10 because the weft elements 12 are in proper perpendicularity to the warp elements 14, 14'. The central warp elements 14' continue substantially straight and rollers 18, 20 continue in alignment notwithstanding the stretching effect of the nip-rolls 16 on sheet 10. But a skewed condition of the weft elements 12, as in Figs. 2 or 3, results in actual rotation of the stretched portion of the sheet, in one direction or the other, with increased distortion of all of the warp elements, including the central warp elements 14'. The rollers 18, 20 become differentially actuated about their respective pivots 19, 21 under the conditions of skew indicated in Figs. 2 and 3, and the differential movements of the rollers 18, 20 are utilized for indicating the direction and magnitude of the skew and for controlling the operations of skew-correcting mechanism (not shown).

When a plurality of tandem pairs of rollers 18, 20 are employed, as in Fig. 4, the lateral stretching of sheet 10 actuates the rollers 18, 20 which are to either side of the central warp elements 14' in all conditions of the weft elements 12. Hence, when the weft elements 12 are in proper perpendicularity to the warp elements 14, 14', as in Fig. 4, the lateral stretching of the sheet actuates those rollers 18, 20 which are to either side of central warp elements 14' but the actuated rollers 18, 20 of each tandem pair are actuated equal amounts in the same direction about their respective pivots 19, 21 with the result that no differential movement of the rolls is produced and no indication is given of any abnormality of the weft elements 12. The central pair of rollers 18, 20 are not actuated. But, the presence of skew and/or bow or of other abnormality of the weft elements, will cause modified distortions of roller-engaged portions of warp elements 14, 14', and the rollers 18, 20 will become differentially actuated to indicate the character of any existing abnormality of the weft elements 12.

Fig. 5 illustrates the same detecting principle as it may be utilized at two or more separately stretched portions of the width of a sheet 10'. In Fig. 5, one portion of the width of sheet 10' is stretched by one set of oppositely pulling nip-rolls 16 and another portion of the width of sheet 10' is stretched by another set of oppositely pulling nip-rolls. One or a plurality of tandem pairs of rollers 18, 20 may act on sheet 10' at each of the stretched portions thereof generally in same manner described in connection with Figs. 1–4.

Referring to Figs. 8, 12 and 13, the sheet 10 is shown passing around guide rolls 22, 24, 26, 28 suitably supported for rotation on a frame indicated generally at 30. The pairs of nip-rolls 16 conveniently may be supported on a fixed and rigid rod or shaft 32 whose opposite ends are secured in brackets 34 upstanding on opposite end portions of frame 30. The nip-rolls 16 may engage sheet 10 intermittently, to intermittently stretch sheet 10, or portions thereof, or the nip-rolls may engage sheet 10 continuously, to constantly stretch the sheet, or portions thereof. Figs. 9–11 illustrate a nip-roll unit 36 which is suitable for intermittently engaging sheet 10, and Fig. 18 shows a generally similar nip-roll unit 36 having its nip-rolls 16 resiliently maintained in constant engagement with each other for constantly stretching a sheet 10 travelling between the nip-rolls.

In the assembly showings of Figs. 6 and 7, the nip-roll units 36 may be considered to be acting intermittently on sheet 10 at the opposite edge portions thereof, each unit 36 being adjustable along the supporting rod 32 for proper setting relative to the opposite edge portions or selvages of sheets of various widths. Also, each pair of nip-rolls is adjustable for setting their axes in selected angular relationships to the direction of travel of sheet 10 thereby to vary the stretching effect of the nip-rolls 16 on sheet 10.

Each nip-roll unit 36 includes a unit body 38 having a bearing sleeve 40 rigid thereon and slidably mounted on rod 32 with a clutch lever 42 pivoted at 44 on an enlargement of sleeve 40. The lever 42 is constantly biased by a spring 43 in counter-clockwise direction about its pivot 4, as viewed in Fig. 10, and the upper side of the lever is formed for meshing with the threads of a screw 46 which has right and left threads thereon and which extends from end to end of the frame 30 in spaced parallelism with the supporting rod 32. The screw 46 is rotatably mounted in end bearings 48 which conveniently may be integral extensions of the brackets 34 which support rod 32. The clutch lever 42 of one nip-roll unit 36 meshes with the right hand threads of the screw and the clutch lever 42 of the other nip-roll unit 36 meshes with the left hand threads of the screw. Hence, with the clutch levers in mesh, rotation of screw 46, as by means of a hand wheel 50 on one end of the screw, will feed the nip-roll units in opposite directions along supporting rod 32. Depression of the clutch levers disengages them from the screw and frees the units for relatively quick and independent sliding adjustments of their positions relative to the edges or selvages of any particular sheet 10.

Mounted rotatably within the unit body 38 of each nip-roll unit 36 is a member 52 which may be secured by locking screw 54 in any selected position of rotation within body 38. Member 52 has depending therefrom the generally yoke-shaped element 56 to whose lower arm the lower nip-roll 16 is rotatably secured. The upper arm of the yoke element has a vertical guide therein at 58 in which a slide member 60 is slidably arranged. The upper nip-roll 16 is rotatably secured to the lower end of slide member 60 and the upper end of slide member 60 is secured to the lower closed end of a tube 62 which is slidable axially within member 52, preferably with anti-friction means intervening between the adjacent surfaces of said tube 62 and member 52. A relatively long compression spring 64 within tube 62 is engaged between the lower closed end of the tube and a plunger 66 having a shank part 67 extending into the air core of a solenoid 68 mounted on and above unit body 38. The solenoid includes an armature 70 which is drawn into the solenoid core when the solenoid is energized thereby to force the plunger 66 downward to its position of Fig. 9, which, through the spring 64, forces the upper nip-roll 16 into sheet-engaging coaction with the lower nip-roll 16. By thus depressing the upper nip-roll through the action of the relatively long spring 64, there is assurance that the pressure exerted on sheet 10 by each pair of nip-rolls can be a continuously uniform pressure throughout each period of nip-roll engagement of a sheet regardless of vibratory characteristics of the solenoid-energizing electric circuit. Also, the pressure exerted on sheet 10 by each pair of nip-rolls may be readily and accurately adjusted to suit any particular requirements or desires. When solenoid 68 is deenergized, spring 64 tends to restore the plunger and armature to their original positions aided by the tension spring 72 which restores tube 62 and slide member 60 to their original positions, and upper nip-roll 16 moves with slide member 60 out of sheet engagement.

As shown, a cover 74 fits over solenoid 68 and may be secured to part 38 by any suitable means such as the screws 76.

Inasmuch as considerable force is applied to each nip-roll unit 36 by the travelling sheet 10 when the nip-rolls are closed upon the sheet, it is desirable to provide means for resisting rotation of the units 36 about the axis of supporting rod 32. For this purpose, each yoke member 56 has its lower arm provided with a depending boss 57 to which a pivot bar 78 is secured as by a screw 80, the pivot bar 78 having a depending pivotal trunnion 82 thereon engaging between two longitudinal guide elements 84, 86 which extend from end to end of frame 30 below the nip-roll units 36. Guide elements 84, 86 restrain the lower portion of each unit 36 against movements about the axis of supporting rod 32 but the pivotal trunnions 82 can move freely along the guide elements when the nip-roll units are being adjusted along the supporting rod 32. Also, since the pivotal trunnion 82 for each unit is on the axis of swinging of the associated pair of nip-rolls 16, the trunnions 82 do not interfere with adjustments of the nip-rolls as regards their angular setting with respect to the direction of travel of sheet 10. The axes of rotation of the nip-rolls 16 may be set at any desired inclination between 90° and 45° to a traverse line extending between oppositely disposed units 36, depending upon the character of the material in sheet 10 and the amount of lateral stretching thereof that is desired.

Assuming intermittent action of the nip-roll units 36, the nip-rolls 16 close upon sheet 10 intermittently in response to intermittent energizations of the solenoids 68 of the nip-roll units 36 (Fig. 9), any suitable pulsing unit 88 (Fig. 20) being electrically connected in a pulsing circuit which, through the relay 90, controls a nip-roll circuit in which the nip-roll unit solenoids 68 are connected in parallel. The pulsing unit 88 may include conventional adjustable resistances (not shown) for selection of desired intervals of on and off action, for intermittently energizing the coil of relay 90 whose movable contact 92 closes the nip-roll circuit through the nip-roll unit solenoids 68 each time relay 90 is energized. Ordinarily the pulsing unit 88 will be set or adjusted to provide one second on periods and five second off periods so that the intermittent lateral stretchings of sheet 10 will persist only momentarily at five second intervals. However, the duration of each on and off period may be selected to suit particular conditions and requirements.

The detector rollers 18, 20 of each detector unit have their pivot shafts 19, 21 rotatably supported in bearings 94 within a unit housing 96, as best seen in Fig. 15. The detector unit housing 96, or each of them, may be adjustably supported on rod 32 and screw 46 by means of a bracket 98 which is slidably supported on both rod 32 and screw 46 and which includes a vertically adjustable depending part 99 to the lower end portion of which one end of the unit housing 96 is pivotally connected at 100. A stop screw 101 is adjustable in bracket part 99 for limiting counterclockwise gravitational rotation of unit housing 96, as viewed in Fig. 15, about the pivotal connection at 100. By properly adjusting stop screw 101 with, if needed, a proper vertical adjustment of bracket part 99, by means of the set screws 99', the rollers 18, 20 may be adjusted to provide a desired contact of the rollers with sheet 10. Bracket 98 may be secured in any selected position along rod 32 by set screws 98', or the like.

As best seen in Figs. 13 and 14, the rollers 18, 20 engage the upper surface of sheet 10 with the rollers in tandem relation and with sheet 10 maintained in operative engagement with rollers 18, 20 by three relatively short rolls 102, 104, 106 which engage sheet 10 at its under surface in the spaced relationships to rollers 18, 20 as seen in Fig. 13. Rolls 102, 104, 106 are mounted in bearings 108 which, in turn, are supported on the longitudinal guide elements 84, 86. Also, the central one 104 of the short rolls acts to remove any furrow made in sheet 10 by the caster roll 20 which, if not removed, might tend to cause caster roll 18 to follow along the furrow regardless of the condition of the sheet as regards skew.

Preferably, the guide rolls 24, 26 have slightly different speeds of rotation with roll 26 travelling slower than roll 24 by means of a belt and pulley interconnection between the rolls as shown at 110 in Figs. 6 and 8, the pulley on roll 26 being slightly larger in diameter than the pulley on roll 24, whereby the region of sheet 10 which is engaged by the caster rolls 18, 20 has less longitudinal tension than the region of sheet 10 approaching roll 24 and the region of sheet 10 leaving roll 26.

Pivot shaft 19 of caster roller 18 has a relatively long arm 112 clamped at 113 to the upper end of the pivot shaft 19 with the free end of the arm carrying a steel armature 114 which projects within the air core of each of two coils 116, 116' mounted in aligned spaced relation exteriorly on unit housing 96 (Figs. 15 and 16), under the cover 118. Similarly, pivot shaft 21 of caster roller 20 has a relatively long arm 120 clamped at 121 to the upper end of the pivot shaft 21 with the free end of the arm carrying a steel armature 122 which projects within the air core of each of two coils 124, 124' mounted in aligned spaced relation exteriorly on unit housing 96, under the housing cover 118. When the rollers 18, 20 are in alignment, the armature 114 will extend equal distances within the the air core of each of the coils 116, 116', and the armature 122 will extend equal distances within the air core of each of the coils 124, 124'. Hence, the electrical impedance of all of the coils 116, 116', 124, 124' will be equal. If and when the caster rollers 18, 20 swing out of alignment in opposite directions about their pivot shafts 19, 21, the impedance of the coils becomes unequal due to unequal extent of the armatures within the coils. As represented diagrammatically in Fig. 20, the coils 116, 116', 124, 124' are electrically connected as parts of an inductive resistance bridge which is thrown out of balance only when the coils 116, 116', 124, 124' are out of balance due to differences in their electrical impedance. Any unbalanced condition of the bridge results in a signal being transmitted to the amplifying unit 126 whose amplified signal may be utilized for indicating a detected abnormality of the weft elements 12 of a sheet 10, or may be utilized, as herein illustrated, for energizing one or the other of the motor-control relays 128, 130 depending upon which of the pairs of coils 116, 124 or 116', 124' have the lesser amount of electrical impedance. The relays 128, 130 may control the operations of a reversible motor 131 of weft-straightening mechanism (not shown).

Although we presently consider it preferable to detect and indicate abnormalities of the weft elements 12 of a travelling woven sheet 10 as a result of intermittent lateral stretching of the sheet by intermittently acting nip-rolls 16, the stretching of sheet 10 may be a constant stretching by nip-rolls which are constantly closed upon the sheet. When such a continuous lateral stretching of a sheet is desired, the simplified electric circuit of Fig. 21 may be employed, which omits the pulsing unit of Fig. 20, and nip-roll units as shown in Fig. 18 may be employed wherein the solenoid 68, 70 of Fig. 9 is replaced by a plate 132 secured by screws 134 to the body 38. Plate 132 acts as an abutment maintaining the spring 64 under compression whereby the spring constantly biases the upper nip roll 16 into engagement with the lower nip roll 16. Any manuel means, such as latch 136, may be provided for manually raising the upper nip roll against the bias of spring 64.

The detection and indication of weft abnormalities when the nip rolls 16, 16 constantly engage the travelling sheet 10 is accomplished in the same manner as earlier described in connection with intermittent nip-roll engagement. However, when the nip-rolls constantly engage the sheet, the trailing caster roll 20 will be spaced a greater distance behind the leading caster roll 18, as in Fig. 5a, so that the trailing caster roll 20 engages portions of the warp elements 14' which are not appreciably distorted by the lateral stretching of sheet 10. This Fig. 5a arrangement of the detector rolls is preferred and desirable when nip-rolls of the Fig. 18 variety are employed to effect continuous stretching of a sheet 10. If there is lateral travel of sheet 10, both caster rolls 18, 20 will be actuated equally in the same direction and the inductance bridge will continue in balance. Hence no signal will be given. But when caster roll 18 is actuated by warp distortions due to weft abnormalities, the caster roll 20 is not actuated because of its location out of the region of stretching of the sheet and the resulting differential of movements of rolls 18, 20 unbalances the bridge to give a signal.

The apparatus of Figs. 6-8 has a single detector unit 96 with a single pair of detector rollers 18, 20 riding on sheet 10 centrally between two nip-roll units whose nip-rolls 16 engage opposite edges or selvages of sheet 10. This embodiment is specifically for detection and indication of skew of the weft elements of sheet 10. According to the invention, however, any desired number of detector units 96 may be distributed along supporting shaft 32 and screw 46, with their individual tandem pairs of rollers 18, 20 engaging warp elements of sheet 10 at any desired locations between the opposite edges of the sheet, thereby to detect and indicate either skew or bow, combinations of skew and bow, and even more complex abnormalities, such as a wavy or sinuous condition of the weft elements. In this connection, it should be noted that any bowed condition of the weft elements comprises two skews which are in opposite directions at opposite sides of the crest of the bow. Also, a wavy or sinuous condition of the weft elements comprises a plurality of bows in opposite directions with each bow comprising two oppositely directed skews. The invention provides for detecting and indicating skew at any particular location between the edges of a travelling woven web or sheet, or at each of a plurality or multiplicity of selected locations between the edges of the sheet, thereby to determine the character of any weft abnormality which includes skew of the weft elements or skew of each of a plurality or multiplicity of portions of the length of weft elements.

In the diagrammatic showings of Figs. 1-4, assuming intermittency of stretching of the sheet 10, the illustrated conditions of the sheet are exaggerated representations of distortions of the longitudinal elements just prior to opening of the stretching nip-rollers 16. Fig. 4 shows a pair of detector rollers 18, 20 riding on sheet 10 relatively close to each of the edges of the sheet and has another pair riding on sheet 10 at a location between the other two pairs. It should be understood that as many additional pairs of detector rollers 18, 20 as desired may be suitably spaced apart between the two outside pairs. The weft elements 12 are in proper perpendicularity to the warp elements 14, 14', and corresponding warp elements at opposite sides of the central warp elements 14' are uniformly but oppositely distorted as a result of the stretching action of nip-rolls 16. Also, each warp element 14 is uniformly distorted at opposite sides of a transverse line extending between the oppositely pulling nip-rolls. Hence, in Fig. 4, the outside pairs of detector rollers 18, 20 are actuated by the distortion of the engaged warp elements 14 but are actuated equally and in the same direction about their respective pivots 19, 21. The detector rollers of the central pair are not appreciably actuated in Fig. 4. Hence, there is no unbalancing of the inductance bridge (Fig. 20) because the armatures 114, 122 (Figs. 16, 20) continue to extend equal distances within the air cores of all of the coils 116, 116', 124, 124', so long as the weft elements continue perpendicular to the warp elements. Also, if sheet 10 shifts bodily to the right or left out of its predetermined path, both rollers 18, 20 of each pair of detector rollers will move equal distances in the same direction about their respective pivots 19, 21, with no unbalancing of the inductance bridge in Fig. 20. This is true also when the detector rollers 18, 20 are located as in Figs. 1-3, or are located anywhere between the oppositely pulling nip-rolls 16.

If and when the weft elements 12, in Fig. 4, become skewed or bowed or otherwise abnormal with respect to the warp elements 14, 14', the particular warp elements 14 and 14' engaged by rollers 18, 20 will be rotated, more or less, to produce differential actuations of the inductance bridge in Fig. 20. Any additional tandem pairs of detector rollers 18, 20 that might be present engaging other warp elements 14, 14' in Fig. 4 would be actuated differentially, or otherwise, depending upon the character of the distortion of any roller-engaged warp elements. Obviously, the differential actuations of the rollers 18, 20 of a detector unit may be utilized for mere indication, or for initiating operation of weft-straightening mechanism whose operation may be in response to one detector unit or to a plurality or multiplicity of correlated detector units.

In some cases it may be desirable to provide for separate nip-roll stretching of different portions of a sheet 10, as by the separate sets of stretching nip-rolls diagrammatically represented in Fig. 5. In this case, any nip-roll units located appreciably inward from the edges of the sheet 10 may have the modified form as illustrated in Fig. 19, wherein the lower nip-roll 16 is mounted independently of the support for the upper nip-roll 16, it being adjustably clamped to the guide elements 84, 86 by means of a nut 83 screwed on the threaded end of the trunnion 82'. The axes of rotation of the two nip rolls 16, in the Fig. 19 embodiment, necessarily must be located in a common vertical plane with the nip rolls in alignment before the nut 83 is tightened.

In Fig. 5, where intermittency of stretching is contemplated, one tandem pair, or a plurality of tandem pairs, of detector rollers 18, 20 may engage warp elements 14, 14' of sheet 10 in each portion of the width of the sheet which becomes separately stretched. Also, if desired, instead of having all of the nip-rolls pulling in a single straight line, one portion of the width of the sheet may be stretched at one location along the path of travel of the sheet and another portion, or other portions, of the width of the sheet may be stretched at another location, or at other locations, along the path of travel of the sheet, the said locations being suitably spaced so that the stretching at any one location will not effect the detecting action at any other location of stretching.

Various changes in the details of the method and apparatus as herein disclosed may be made without departing from the scope of the invention as defined in the appended claims, and it is intended that the patent shall cover, by suitable expression in the appended claims, whatever features of patentable novelty exist in the invention disclosed.

We claim as our invention:

1. The method of detecting an abnormal condition of the transverse elements relative to the longitudinal elements of a travelling woven web whose said transverse elements normally are perpendicular to the longitudinal elements of the web, comprising subjecting at least a substantial portion of the width of the travelling web to transverse tension applied to said portion of the web substantially equally in generally opposite transverse directions thereby to stretch the said portion of the web transversely of the web with incidental distortion of longitudinal elements of the web, and utilizing the said distortions of longitudinal elements which are inward from the edges of the web to detect an abnormal condition of the transverse elements relative to the longitudinal elements.

2. The method of detecting an abnormal condition of the weft elements relative to the warp elements of a travelling woven web, comprising tensioning at least a substantial portion of the width of the web transversely of the web to distort warp elements of the web which are inward from the edges of the web in the region which is tensioned, and utilizing the said distortions of warp elements which are inward from the edges of the web to detect an abnormal condition of the weft elements relative to the warp elements.

3. The method of detecting an abnormal condition of the weft elements relative to the warp elements of a travelling woven web, comprising gripping the web at transversely opposite spaced locations and pulling the web substantially equally and oppositely at said gripping locations to stretch transversely the portion of the web between said gripping locations with incidental distortion of warp elements at said stretched portion of the web, and utilizing longitudinally different distorted portions of the same distorted warp elements to effect a differential response of detecting means if and when the weft elements of the web are in an abnormal relation to the warp elements of the web.

4. The method of controlling the operation of drive means for weft straightening mechanism, comprising applying opposite transversely directed substantially equal tensioning forces to at least a substantial portion of a travelling woven width of the web at transversely opposite locations thereby to distort longitudinal elements of the web, and utilizing longitudinally different distorted portions of the same distorted longitudinal elements to effect differential response of said drive means for weft straightening mechanism with the differences in characteristics of the said distortions creating differences in the differential response of the drive means.

5. The method of detecting a condition indicative of a need for restoring displaced and deformed transverse elements to perpendicularity to the longitudinal elements in a travelling woven web, comprising intermittently stretching at least a substantial portion of the width of the travelling web by pulling said portion simultaneously but intermittently in opposite transverse directions thereby to intermittently distort longitudinal elements which are inward from the edges of the web, the character of said distortions varying with variations in the condition of said transverse elements relative to said longitudinal elements, and utilizing variations in the character of said distortions of the longitudinal elements which are inward from the edges of the web to control the operations of means for driving corrective mechanism.

6. Apparatus for detecting an abnormality of weft elements relative to warp elements of a travelling woven sheet, comprising sheet-pulling means arranged and adapted to transversely stretch at least a substantial portion of the width of the sheet by pulling said portion of the sheet substantially equally in opposite transverse directions at a predetermined location along the path of travel of the sheet thereby to provide induced substantial distortions of the warp elements at said stretched portion of the sheet, and means inward from the edges of the sheet responsive to the said distortions of warp elements which are inward from the edges of the sheet for detecting an abnormality of the weft elements relative to the warp elements.

7. Apparatus for detecting an abnormality of weft elements relative to warp elements of a travelling woven sheet, comprising two pairs of co-acting nip-rolls arranged to grip the sheet at two transversely opposite locations with the travelling sheet passing between and rotating the rolls of each said pair, means for adjusting the axes of rotation of the nip-rolls into any of various angular relationships to the direction of travel of the sheet with the said axes of the two pairs at equal but opposite angles to the said direction of travel of the sheet whereby said pairs of nip-rolls stretch transversely the portion of the sheet which extends between them with incidental distortion of warp elements which are inward from the edges of the sheet, detector means acting on said sheet between the said pairs of nip-rolls and adapted to be actuated by distorted warp elements which are inward from the edges of the sheet at the location of the detector means, said detecting means being adapted to be actuated variously with variations of the character of the said distortions of warp elements due to abnormalities of weft elements thereby to detect the presence and character of said weft abnormalities.

8. Apparatus for detecting an abnormality of weft elements relative to warp elements of a travelling woven sheet, comprising two pairs of rollers adapted to engage the sheet at transversely spaced locations, means for supporting said pairs of rollers at said locations with the axes of rotation of the rollers of one pair in parallelism at opposite sides of the sheet and at an angle to the direction of travel of the sheet, and with the axes of rotation of the rollers of the other pair in parallelism at opposite sides of the sheet and at an equal but opposite angle to the direction of travel of the sheet, the said angles being such that rotation of the rollers by the engaged sheet produces lateral stretching of the portion of the sheet which is between said pairs of rollers thereby to distort warp elements of the sheet, a pair of pivoted longitudinally spaced rollers riding on warp elements of the sheet at said laterally stretched portion thereof and adapted to be differentially actuated about their pivots by the said distortions of warp elements only when the travelling sheet comes to the stretching rollers with its weft elements in abnormal relation to its warp elements, and means responsive to differential actuation of said longitudinally spaced rollers for signalling the presence of a detected abnormality of weft elements relative to warp elements of the sheet.

9. Apparatus for detecting an abnormality of weft elements relative to warp elements of a travelling woven sheet, comprising two nip-roll units arranged to grip the travelling sheet at transversely spaced locations, means for adjusting the axes of rotation of the nip-rolls of each said unit thereby to position the axes of the nip-rolls of one unit at a predetermined angle to the direction of travel of the sheet and to position the axes of the nip-rolls of the other unit at an equal but opposite angle to the direction of travel of the sheet with the said angularly positioned axes intersecting each other forwardly of the nip-roll units in the direction of travel of the sheet, whereby rotation of the nip-rolls of the two said units by the engaged travelling sheet produces lateral stretching of the portion of the sheet between said units with incidental distortion of warp elements of the sheet, and longitudinally spaced differentially actuatable means arranged to be actuated by different distorted portions of the same distorted warp elements if and when the weft elements are in an abnormal relation to the warp elements, the magnitude of the said actuations and of the differentials thereof varying with variations in the character of the distortions of said actuating portions of distorted warp elements.

10. Apparatus for detecting an abnormal condition of the transverse elements relative to the longitudinal elements of a travelling woven web whose transverse elements normally are perpendicular to the longitudinal elements of the web, comprising oppositely disposed means arranged and adapted to stretch at least a substantial portion of the width of the web transversely of the direction of its travel thereby to distort longitudinal elements of the web, pivoted means at a plurality of longitudinally spaced locations and arranged to be engaged and actuated by longitudinally different portions of the same longitudinal elements of said stretched portion of the web whereby differences in the characters of the distortions of said different portions of the same longitudinal elements provide varying differential responses of said pivoted means, and power means operative in response to the actuations of said web-engaging means when said transverse elements are in an abnormal condition.

11. Apparatus for detecting an abnormal condition of the transverse elements of a travelling woven web whose transverse elements normally are perpendicular to the longitudinal elements of the web, comprising two pairs of co-acting nip rollers adjustably mounted in substantially spaced relation for engaging transversely opposite portions of the travelling web, each pair of said nip rollers being disposed with the axes of rotation of the nip rollers oblique to the direction of travel of the web and with the nip rollers adapted to be rotated by the web in directions to effect equal and opposite transverse pulls on the portion of the web between said pairs of nip rollers with resulting distortion of longitudinal elements of the web which distortions vary in character when transverse elements of the web are in any abnormal relation to the longitudinal elements, and movably mounted detector means in engagement with longitudinally different portions of the same longitudinal elements for responding differentially to differences in the character of the distortions of said different portions of the same longitudinal elements.

12. In an apparatus for detecting any abnormality of weft elements relative to warp elements in a travelling woven sheet, a plurality of nip-roll units mounted for transverse stretching of a substantial portion of the width of the sheet, each said unit comprising a pair of rollers adapted to engage the sheet at opposite sides thereof, means movably supporting one of said rollers for movements into and out of engagement with the other roller, means, including a relatively long compression spring, for resiliently maintaining said movably supported roller in sheet-engaging relation to the other roller when said rollers are in their said engagement with opposite sides of the sheet, and a plurality of actuatable means for engaging longitudinally different portions of the same warp elements and differentially responsive to distortions of said different portions of the same warp elements thereby to detect abnormalities of the weft elements relative to the warp elements.

13. In an apparatus for detecting any abnormality of weft elements relative to warp elements in a travelling woven sheet, a plurality of nip-roll units mounted for transverse stretching of a substantial portion of the width of the sheet, each said unit comprising a pair of rollers adapted to engage the sheet at opposite sides thereof, means movably supporting one of said rollers for movements into and out of engagement with the other roller, means constantly biasing said movably supported roller in direction away from the other roller, means including a relatively long coil spring for actuating said movably supported roller, through said spring, into sheet engaging coaction with the other roller, and differentially actuatable detector means for engaging longitudinally different portions of the same warp elements in said stretched portion of the sheet and differentially responsive to distortions of said warp elements at the said longitudinally different portions thereof.

14. In an apparatus for detecting weft abnormalities in a travelling woven sheet, means for laterally stretching a predetermined portion of the width of the travelling sheet thereby to distort warp elements of the stretched portion of the sheet with the character of the said distortions varying if and when the weft elements are out of perpendicularity to the direction of the travel of the portion of the sheet which is approaching the region of said stretching, detector means engaging longitudinally different portions of the same warp elements in the stretched portion of the sheet and adapted to respond differentially to differences in the character of the distortions at said longitudinally different engaged portions of warp elements thereby to detect any appreciable departure of the weft elements from perpendicularity to the said direction of travel of the said portion of the sheet which is approaching the region of said stretching.

15. Apparatus for detecting an abnormal condition of the transverse elements of a travelling woven web whose transverse elements normally are perpendicular to the longitudinal elements of the web, comprising spaced guide rolls over and between which the woven web travels, two pairs of nip rollers, mounting means for supporting said pairs of nip rollers with the rollers of one pair in positions to engage opposite sides of the travelling sheet at one location between said guide rolls and with the rollers of the other pair in positions to engage opposite sides of the travelling sheet at another location between said guide rolls which is spaced transversely of the sheet from the said one location, said pairs of rollers being arranged and adapted to engage said travelling sheet and to be rotated thereby in directions to effect lateral stretching of the portion of the sheet between the pairs of nip rollers, means for adjusting said pairs of nip rollers toward and from each other thereby to vary the width of the portion of the sheet which becomes stretched by said pair of nip rollers, a said lateral stretching of said portion of the sheet by said pairs of nip rollers having the effect of distorting longitudinal elements in said stretched portion, and the character of said distortions varying with changes in the condition of the transverse elements in said stretched portion, and differentially actuatable detector means engaging longitudinally different portions of the same longitudinal elements in said stretched portion of the sheet for responding differentially to distortion of said engaged longitudinal elements thereby to detect existing abnormalities of the transverse elements in said stretched portion of the travelling sheet.

16. Apparatus for detecting an abnormality of transverse elements relative to longitudinal elements of a travelling woven sheet, comprising laterally spaced sheet engaging means arranged and adapted to engage the travelling sheet and to laterally stretch the portion of the width of the sheet which is between said sheet engaging means, means for intermittently actuating said sheet engaging means into sheet engagement thereby to effect only intermittent stretching of said portion of the sheet which is between said sheet engaging means, and detector means between said laterally spaced sheet engaging means riding on said portion of the sheet which is intermittently stretched, said detector means responding variously to changes in the character of distortions of longitudinal elements in said intermittently stretched portion of the sheet on which said detector means rides thereby to detect any abnormality of transverse elements of the sheet of a nature to change the character of said distortions of said longitudinal elements of the sheet.

17. The method of detecting an abnormal condition of the transverse elements relative to the longitudinal elements of a travelling woven web whose said transverse elements normally are perpendicular to the longitudinal elements of the web, comprising subjecting at least a substantial portion of the width of the travelling web to transverse tension applied to said portion of the web substantially equally in generally opposite transverse directions thereby to stretch the said portion of the web transversely of the web with incidental distortion of longitudinal elements of the web, and utilizing longitudinally different distorted portions of the same distorted longitudinal elements to effect a differential response of detecting means if and when the transverse elements of the web are in an abnormal relation to the longitudinal elements of the web.

18. The method of detecting an abnormal condition of the weft elements relative to the warp elements of a travelling woven web, comprising tensioning at least a substantial portion of the width of the web transversely of the web to distort warp elements of the web in the region which is tensioned, arranging detecting means in operative relation to longitudinally different portions of the same longitudinal elements at said tensioned region of the web, and utilizing the distortions of said longitudinally different portions of the same longitudinal elements to produce a differential response of said detecting means if and when the transverse elements of the web are in an abnormal relation to the longitudinal elements of the web.

19. Apparatus for detecting an abnormality of weft elements relative to warp elements of a travelling woven sheet, comprising sheet-pulling means arranged and adapted to transversely stretch at least a substantial portion of the width of the sheet by pulling said portion of the sheet substantially equally in opposite transverse directions at a predetermined location along the path of travel of the sheet thereby to provide induced substantial distortions of the warp elements at said stretched portion of the sheet, and longitudinally spaced independently actuatable detector means arranged to be actuated by longitudinally different distorted portions of the same longitudinal elements if and when the weft elements are in an abnormal relation to the warp elements.

References Cited in the file of this patent
UNITED STATES PATENTS 2,421,575    Nield _____ June 3, 1947